United States Patent
Masuda et al.

(10) Patent No.: US 11,144,581 B2
(45) Date of Patent: Oct. 12, 2021

(54) VERIFYING AND CORRECTING TRAINING DATA FOR TEXT CLASSIFICATION

(71) Applicant: INTERNATIONAL BUSINESS MACHINES CORPORATION, Armonk, NY (US)

(72) Inventors: Satoshi Masuda, Tokyo (JP); Kohtaroh Miyamoto, Tokyo (JP); Futoshi Iwama, Tokyo (JP); Hironori Takeuchi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 16/046,320

(22) Filed: Jul. 26, 2018

(65) Prior Publication Data

US 2020/0034482 A1 Jan. 30, 2020

(51) Int. Cl.
*G06F 7/00* (2006.01)
*G06F 16/00* (2019.01)
*G06F 16/35* (2019.01)
*G06N 20/00* (2019.01)

(52) U.S. Cl.
CPC .......... *G06F 16/353* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,826,576 | B2 * | 11/2004 | Lulich | G06F 16/954 707/740 |
| 8,626,682 | B2 * | 1/2014 | Malik | G06K 9/6259 706/12 |
| 2006/0288275 | A1 * | 12/2006 | Chidlovskii | G06F 16/83 715/236 |
| 2012/0215727 | A1 * | 8/2012 | Malik | G06N 5/02 706/12 |
| 2013/0097103 | A1 * | 4/2013 | Chari | G06N 20/00 706/12 |
| 2014/0297267 | A1 * | 10/2014 | Spencer | G06F 40/274 704/9 |
| 2015/0081654 | A1 * | 3/2015 | Spangler | G06F 16/3325 707/706 |
| 2015/0095275 | A1 | 4/2015 | Lamba | |
| 2016/0062985 | A1 * | 3/2016 | Epstein | G06F 40/216 704/9 |
| 2016/0162456 | A1 * | 6/2016 | Munro | G06F 16/288 704/9 |
| 2018/0032870 | A1 * | 2/2018 | Liu | G06Q 10/04 |

* cited by examiner

*Primary Examiner* — Tuan A Pham
(74) *Attorney, Agent, or Firm* — Tutunjian & Bitetto, P.C.; Randall Bluestone

(57) ABSTRACT

Methods and systems for text classification include identifying a text sample, classified according to a first class in a set of hierarchical graphs of classes, that is more similar to a second class in the set of hierarchical graphs of classes than to the first class according to a similarity metric. A word is deleted from the identified text sample that is associated with the second class. A word is added to the identified text sample that is associated with the first class. A text classification model is trained using the text sample as training data. Text classification is performed on an input text using the trained text classification model implemented on a processor device.

18 Claims, 6 Drawing Sheets

VERIFYING AND CORRECTING TRAINING DATA FOR TEXT CLASSIFICATION

BACKGROUND

Technical Field

The present invention generally relates to text classification and, more particularly, to the automatic generation of training data for use in training text classification systems.

Description of the Related Art

Text classification systems with supervised machine learning are used to automatically interpret and classify input information, providing rapid access to a large knowledge base using natural language. The text classification systems accept input text and identify one or more classes to which the text belongs, making it possible to, for example, provide responses to natural language queries.

Such classification systems need training data to adequately train their classification models. However, such training data is often generated manually, by human operators who provide alternate versions of a given text sample, which is a time-consuming and potentially expensive process. In addition, manually generated training data can drift across classification boundaries as a result of being too similar to samples in other classes, causing the trained system to classify data into the wrong classes.

SUMMARY

A method for text classification includes identifying a text sample, classified according to a first class in a set of hierarchical graphs of classes, that is more similar to a second class in the set of hierarchical graphs of classes than to the first class according to a similarity metric. A word is deleted from the identified text sample that is associated with the second class. A word is added to the identified text sample that is associated with the first class. A text classification model is trained using the text sample as training data. Text classification is performed on an input text using the trained text classification model implemented on a processor device.

A text classification system includes a verification and correction module configured to identify a text sample, classified according to a first class in a set of hierarchical graphs of classes, that is more similar to a second class in the set of hierarchical graphs of classes than to the first class according to a similarity metric, to delete a word from the identified text sample that is associated with the second class, and to add a word to the identified text sample that is associated with the first class. A training module is configured to train a text classification model using the text sample as training data. A classification module is configured to perform text classification on an input text using the trained text classification model implemented on a processor device.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide text classification with automatically verified and corrected training data. The present embodiments process a set of hierarchically categorized, input training data texts to determine points where individual pieces of training data text are too similar to training data in a different hierarchy. The present embodiments then correct the training data in question to make the training data more similar to the training data in its own hierarchy and less similar to the training data in the other hierarchy. This can be accomplished by, e.g., adding and deleting words in the training data text. When the corrected training data is used to train a language classification system, the classification system does a better job of classifying input data.

Figure 1:
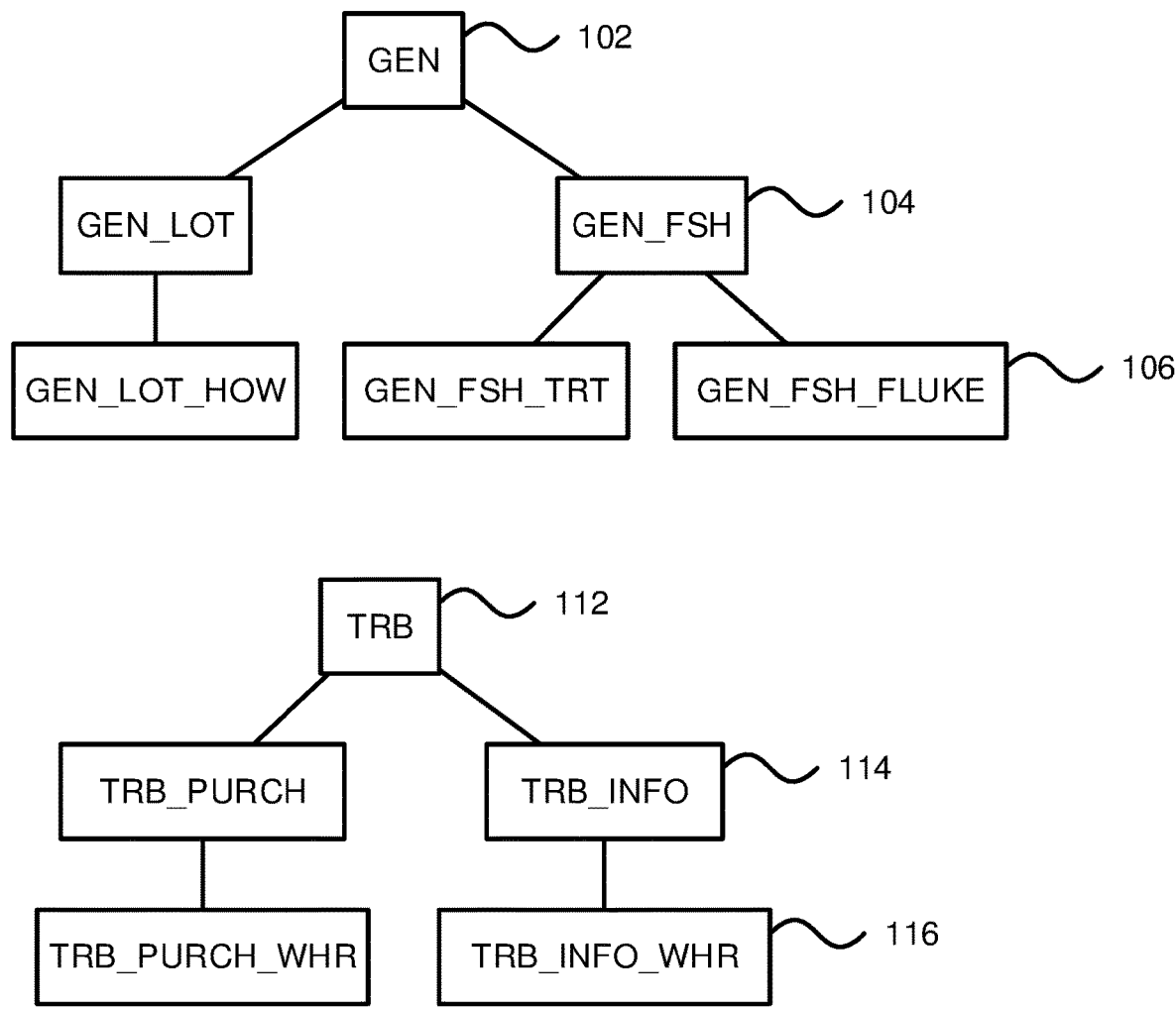
FIG. 1 is a diagram of distinct classification hierarchies that include hierarchical organizations of classes, illustrating a similarity between classes that can inadvertently be bridged by manual generation of training data in accordance with an embodiment of the present invention.

Referring now to FIG. 1, a classification hierarchy for text classification is shown. In this example, two different hierarchies are shown, one having a root node 102 for "general information," the other having a root node 112 for "turboball lottery information," relating to a fictional interstate lottery game. Each hierarchical graph is identified by its respective root node 102/112 (e.g., "GEN" or "TRB"). Each hierarchy has one or more intermediate levels 104/114, and one or more classes 106/116. A text classification system will take input text (e.g., a question) and will classify the input text into one of the classes 106/116. The classification is determined according to some measure of similarity between the input text and one or more representative existing members of the classes 106/116. There may be any number of intermediate levels 104/114 in the hierarchy between the root node and a given class, representing different branches and subdivisions in the knowledge base.

Following this example, an original text sample may read, "In which states is Turboball available?" A set of derived text samples can then be generated by, for example, one or more human operators. The derived text samples will include semantically similar texts that vary from the original text sample by, for example, the exchange of synonyms and the use of equivalent grammars. Thus, derived text samples in this example may include, e.g., "In which states can I get Turboball?" "Where can I get Turboball lottery tickets?" and, "Where can I purchase lottery tickets?" The original text sample may be classified in class TRB_PURCH_WHR, and it is expected that the derived samples will be classified to the same class.

When these derived text samples are used to train a classifier, however, they may be too close to another existing class, resulting in misclassification. The present example may include, in the "general information" hierarchy 102, an intermediate level 104 for "general lottery information," which has a class 106 for "general lottery how-to," GEN_LOT_HOW. Thus, the derived sample of, "Where can I purchase lottery tickets?" may be miscategorized in GEN_LOT_HOW instead of in TRB_PURCH_WHR. The result of this occurrence during training is that the trained text classification system is less likely to correctly classify actual inputs, because it will be trained to consider questions that are more properly regarded as being in the "GEN" hierarchy as being in the "TRB" hierarchy.

The example of FIG. 1 illustrates two disjoint graphs, where the respective hierarchies of the graphs are completely separate and no node is shared between them. The classification system may include any number of such graphs. The classes that make up each graph are connected by directed edges, where the direction of each edge indicates a hierarchical relationship between the classes that the edge connects. Projected onto a semantic space, these two hierarchies represent distinct clouds of meaning, with the similarity metric measuring distances in the space. The classification system attempts to correctly identify which hierarchy a given input belongs to, based on its position in the semantic space. However, if the training data is too close together, then the classification system can have trouble making correct decisions.

Embodiments of the present invention therefore perform verification of the derived text samples to ensure that they do not cross hierarchies. An example of such a crossing of hierarchies occurs when a text sample is more similar to a class from another hierarchy than it is to its own hierarchy. A similarity metric is used to determine whether a given derived text sample is closest to a class in the hierarchy of the original text sample or whether the derived text sample is instead closest to a class in a different hierarchy.

Figure 2:
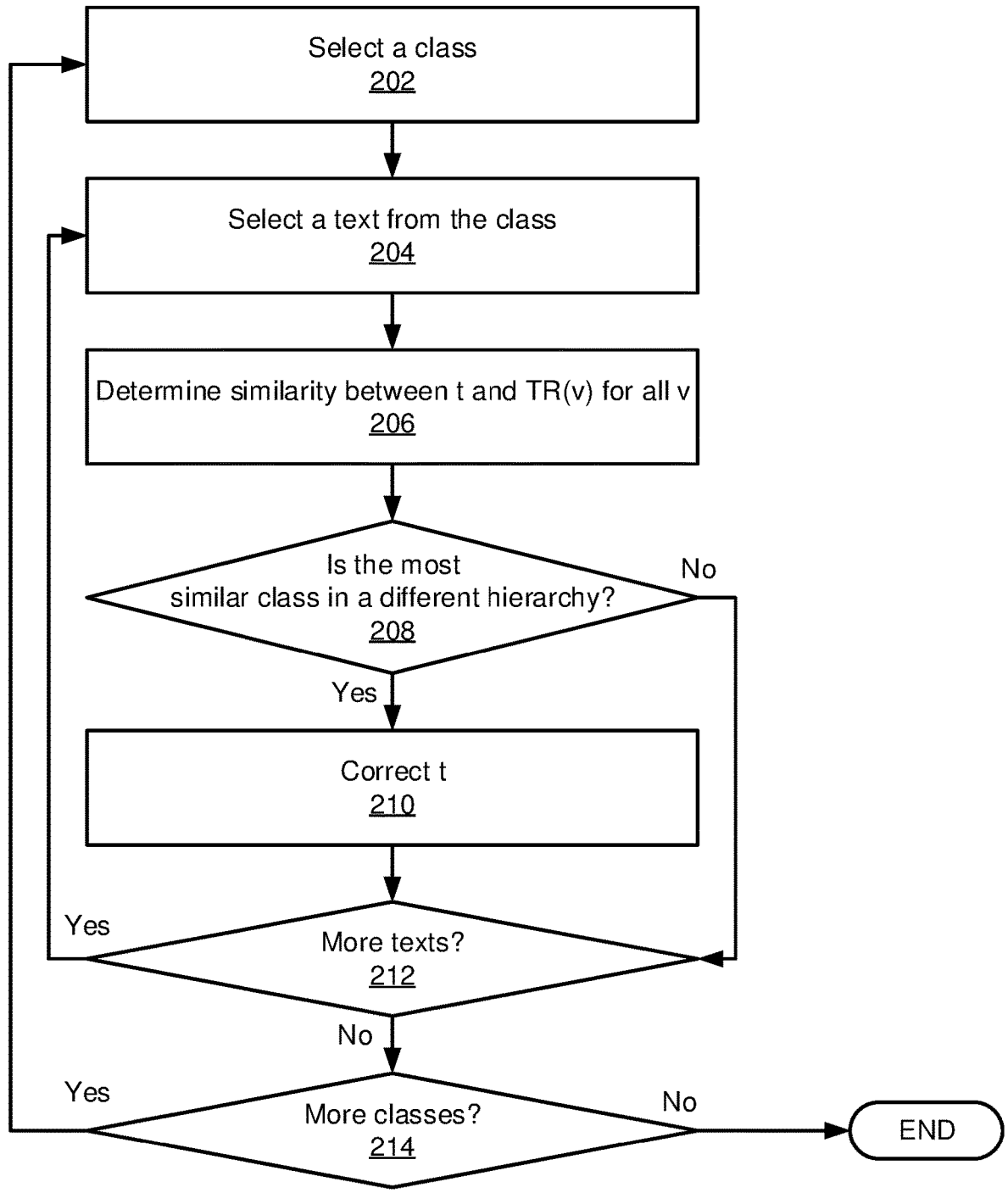
FIG. 2 is a block/flow diagram of a method for training data verification and correction that identifies instances of training data that are too similar to other classes and are then modified to bring them closer to their own intended class in accordance with an embodiment of the present invention.

Referring now to FIG. 2, a method for providing verification and correction of text samples is shown. The classes are arranged in one or more hierarchies and are expressed herein as a set of directed graphs G=(V, E), where V is the set of classes, v represents individual classes in the set V, and E is a set of directional edges that indicate a hierarchical relationship. The function T(v) returns a list of texts associated with the class v, with an individual text being designated as t. Thus, following the above example, T(v) provides a list of input texts that include the derived training data.

The function TR (v) returns a representative sample text associated with the class v. This representative sample may be the most central according to some clustering metric. Alternatively, any other appropriate selection metric for picking the representative sample text for a class may be used instead. The function W provides a list of morphemes associated with a list of texts. Although the present embodiments are described in terms of using morphemes, it should be understand that lists of parsed words may be used instead. For example, W(TR(v)) provides a list of morphemes in TR(v), while W(T(v)) provides a list of morphemes in T(v). This may equivalently be expressed as providing a list of words from each text.

Block 202 selects a first class v from V. Block 204 selects a first text t from T(v). Block 206 determines a similarity between t and TR(v) across all v in V. Similarity between two texts may be calculated in any appropriate fashion including, e.g., cosine similarity or term-frequency inverse-document-frequency (TF-IDF). Block 206 thereby determines a class that is most similar to the text t by determining which class has the highest similarity. In the case of using TF-IDF to determine similarity, the entire input text t is evaluated for its terms' frequency within TR(v) as compared to the corpus formed by TR(v) considered across all v in V. The TF-IDF score then represents a similarity score for v that can be compared to scores generated for the other classes in V.

Addressing the TF-IDF score in more detail, TF-IDF is a statistic that first computes how frequently a term or set of terms appears within a document and then weights those words negatively based on how frequently they appear across the corpus. Thus, in the following example, if the words of the text t appear frequently in TR(v), the "TF" portion of TF-IDF will be high. However, if those same words are common words that appear frequently across TR(v) when considered for all v in V, then the score will be reduced accordingly.

Block 208 determines whether the most similar class to the text t is in a different hierarchy, rather than simply being another class within the same hierarchy as t. For some embodiments of the present invention, an exact match between the intended class and the most similar class is not needed, as long as the matched TR (v) is anywhere in the same hierarchical graph as the text in question. If not (e.g., if the best match is within t's own hierarchy), then processing continues to block 212. If so, then block 210 corrects t as described below.

Block 212 determines whether there are more texts in T(v) to consider. If so, processing returns to block 204 and a new text is selected. If not, block 214 determines whether there are more classes v ∈ V to consider. If so, processing returns to block 202 and a new class is selected from among the classes in V that have not already been considered. If not, processing concludes as all text samples have been verified.

Figure 3:
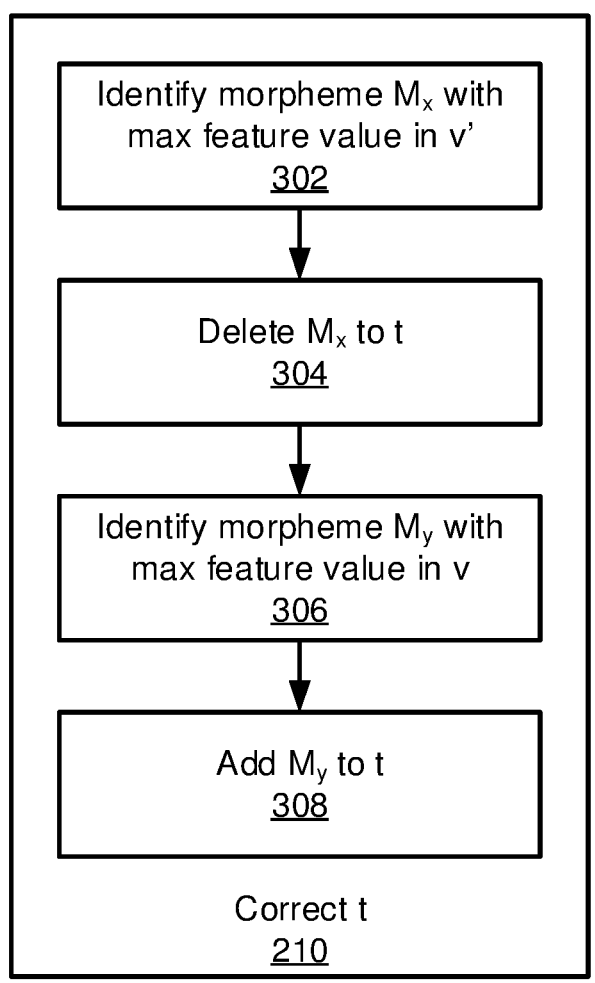
FIG. 3 is a block/flow diagram of a method for correcting training data text samples that are too similar to other classes by deleting a word that is associated with the other class and adding a word that is associated with the intended class in accordance with an embodiment of the present invention.

Referring now to FIG. 3, additional detail on the correction of text in block 210 is shown. Block 302 identifies a morpheme $M_x$ in W(t) that has a highest feature value out of W(t) ∩W(TR(v')), with v' being identified as the class where TR(v') is the most similar to t in block 208. Block 304 deletes $M_x$ from t. Block 306 then identifies a morpheme $M_y$ from W(TR(v)), where v is the home class for t. Block 308 adds $M_y$ to t. Thus, one morpheme/word is deleted from the text sample and one morpheme/word is added to the text sample, with the effect of moving the text sample much closer to its intended class in the semantic space.

The term "feature value" refers to a metric for determining how important each morpheme is. In one example, the "feature value" may be calculated using a term frequency inverse document frequency (TF-IDF) metric that provides a higher value to rarer words. This feature value is calculated for every morpheme in all derived text and text samples. Thus, all of the morphemes from the text samples in each class are assessed to generate respective feature values that more heavily weight the terms that are used least in each class. In this manner the morpheme/word in the text sample that is most characteristic of the matched class is removed and a morpheme/word that is characteristic of the intended class is added.

The result is a corrected text t that is much more strongly aligned with its own class v than with the other class v'. Following the above example of a text, "Where can I purchase lottery tickets?" the most similar class may be, e.g., GEN_LOT_HOW, instead of the original class, TRB_PURCH_WHR. In this example, the word in t that has a highest feature value in the morphemes in the representative text of GEN_LOT_HOW may be "tickets." Block 304 would therefore delete the word "tickets" from t, leaving, "Where can I purchase lottery?"

Block 306 then looks for the highest feature value of all the words in TRB_PURCH_WHR, which may for example be the word "Turboball." Block 308 then adds this word to t, creating, "Where can I purchase lottery Turboball?" This alteration changes how t will perform when compared for similarity to the various classes, and the two alterations will move it closer to the class from which it derives. It should be understood that the correction of t may result in a text sample that makes little semantic sense when read by a human being, as significant words have been added and removed, but this corrected text sample nonetheless provides superior results when used to train the classification system as compared to the derived text sample. It is specifically contemplated that the addition and deletion of words in the text sample may be performed without regard to grammar or word order, but other embodiments of the present invention may attempt to preserve grammatical structure.

Figure 4:
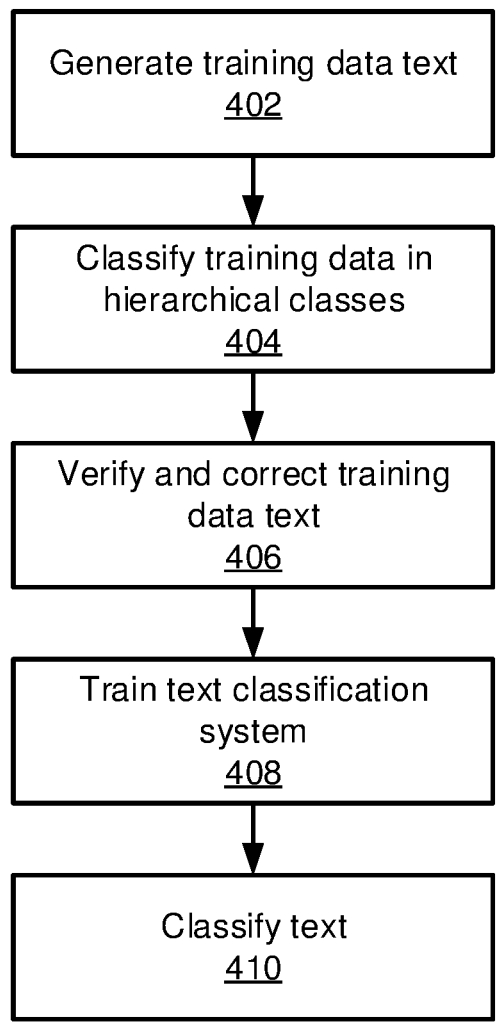
FIG. 4 is a block/flow diagram of a method for performing text classification using training data that has been manually derived by verifying and correcting the training data before training is performed to ensure that the trained classification model correctly classifies input texts in accordance with an embodiment of the present invention.

Referring now to FIG. 4, a method for text classification is shown. Block 402 generates training data text. This may be performed by human operators who create text from scratch or who derive text from existing text samples by, e.g., exchanging words with synonyms or generating new texts with similar semantic content. Block 404 then classifies the training data according to a predefined set of hierarchical classes. The classification of block 404 may also be performed manually, or may alternatively be performed according to a separate text classification system. This classification is needed because verification checks whether the training data are most closely aligned with an appropriate class.

Block 406 then performs verification and correction of the training data text as described above. This process moves training data texts closer to an expected clustering when the training data is too similar to an unintended class. Block 408 then uses the verified and corrected training data text to train a text classification system. The text classification system may be implemented with any appropriate variety of machine learning such as, e.g., an artificial neural network. Once the text classification system has been trained in block 408, input text may be classified in block 410 to determine to which class the input most likely belongs.

As a result of the corrections described above, the accuracy of answered classes is improved without any special classification methodology being employed, but instead solely through verification and correction of the training data used to train the machine learning model. The present embodiments can thus be applied to any appropriate classification process by performing verification and correction on the training data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
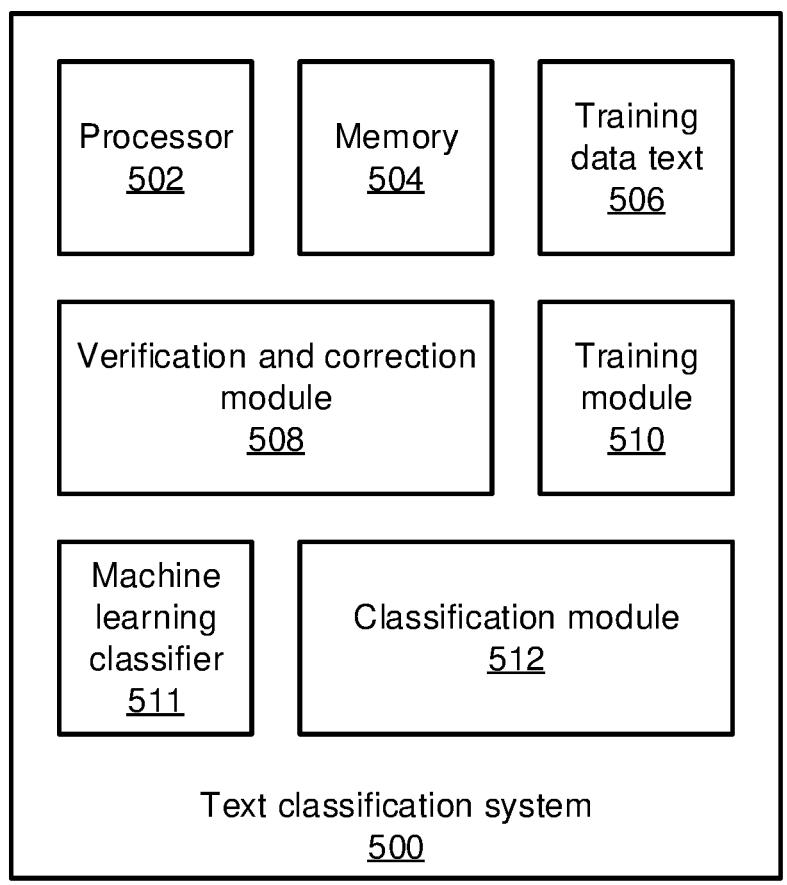
FIG. 5 is a block diagram of a text classification system that performs text classification using training data that has been manually derived by verifying and correcting the training data before training is performed to ensure that the trained classification model correctly classifies input texts in accordance with an embodiment of the present invention.

Referring now to FIG. 5, a text classification system 500 is shown. The system 500 includes a hardware processor 502 and memory 504. The memory stores training data text 506, which may include, for example, a set of original and derived text samples. The training data text 506 is organized into a set of hierarchically organized classes.

The system 500 further includes one or more functional modules which may, in some embodiments, be implemented as software that is stored in memory 504 and that is executed by hardware processor 502. In other embodiments, the functional modules may be implemented as one or more hardware components in the form of, e.g., application-specific integrated chips or field programmable gate arrays.

A verification and correction module 508 operates on the training data text to identify derived text samples that are more similar to the representative texts of other hierarchies than to their own hierarchy. Verification and correction module 508 then alters the identified text sample by removing a word most linked to the other hierarchy and by adding a word most linked to its own hierarchy. Using the verified and corrected training data text, training module 510 trains a machine learning classifier. Classification module 512 then uses the machine learning classifier 511 to classify new input texts in accordance with the hierarchically organized classes.

The machine learning classifier 511 may be used to operate on arbitrary texts, but it is particularly contemplated that the machine learning classifier 511 may work within a particular knowledge base to identify the subject matter of an input question. One specific application of such a classifier would be to manage a large "Frequently Asked Questions" database, allowing questions to be provided in natural language with a rapid identification of appropriate subject matter. The present embodiments therefore provide training data that would help correctly identify the subject matter, reducing the likelihood of introducing irrelevant subjects in response to a user's question.

Figure 6:
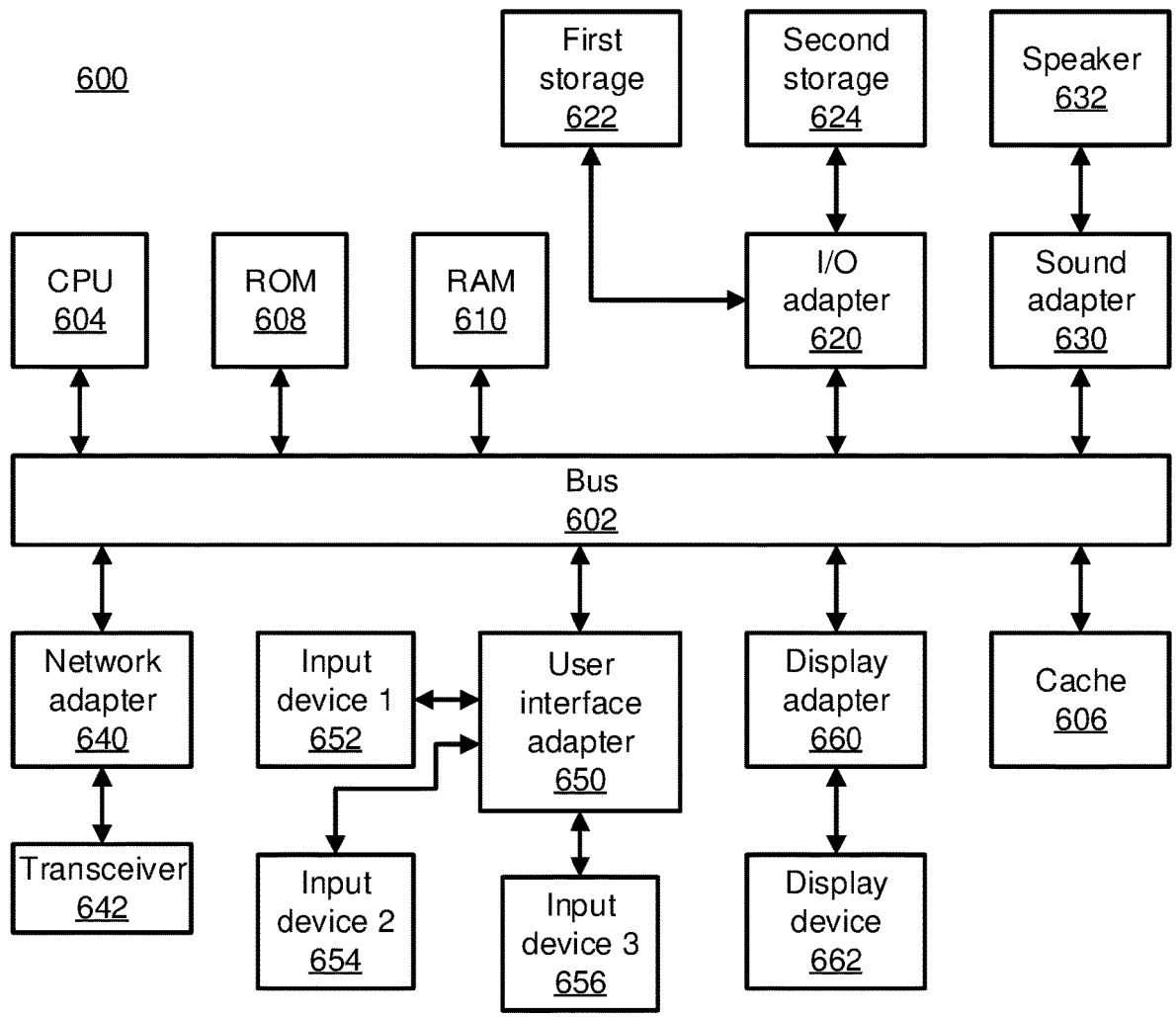
FIG. 6 is a block diagram of an exemplary processing system in accordance with an embodiment of the present invention.

Referring now to FIG. 6, an exemplary processing system 600 is shown which may represent the text classification system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of verifying and correcting training data for text classification (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for text classification, comprising:
    identifying a text sample that has been derived from another text sample in a first text class of a plurality of hierarchical graphs of text classes, the identified text sample having a class label that identifies the first text class, wherein the identified text sample is more similar to a second text class in the plurality of hierarchical graphs of text classes than to the first text class, according to a similarity metric;
    deleting a word from the identified text sample that is associated with the second text class, to move the identified text sample away from the second text class in a semantic space, causing the identified text sample to more closely conform to a hierarchical graph of classes that includes the first class;
    adding a word to the identified text sample that is associated with the first text class, to move the identified text sample toward the first text class in the semantic space, causing the identified text sample to more closely conform to a hierarchical graph of classes that includes the first class;
    training a text classification model to assign class labels to samples, using the identified text sample as training data, to provide superior text classification performance in discriminating between the first class and the second class; and
    performing text classification on an input text using the trained text classification model implemented on a processor device.

2. The method of claim 1, wherein identifying the text sample comprises comparing the text sample to a representative text sample from each class in the plurality of hierarchical graphs of classes according to the similarity metric.

3. The method of claim 1, wherein the plurality of hierarchical graphs of classes comprises a plurality of disjoint graphs.

4. The method of claim 3, wherein the first and second classes do not belong to a same graph hierarchy.

5. The method of claim 3, wherein each hierarchical graph comprises a plurality of classes and a plurality of directed edges between classes, with each directed edge indicating a hierarchical relationship between its connected classes.

6. The method of claim 1, wherein the word that is associated with the first class is a word having a highest term frequency inverse document frequency value across all texts in the first class.

7. The method of claim 1, wherein the word that is associated with the second class is a word having a highest term frequency inverse document frequency value across all texts in the second class.

8. The method of claim 1, wherein the similarity metric is selected from the group consisting of cosine similarity and a term frequency inverse document frequency value.

9. The method of claim 1, wherein identifying the text sample comprises comparing the text sample to a representative text sample from each class in the plurality of hierarchical graphs of classes according to the similarity metric, wherein the word that is associated with the first class is a word having a highest term frequency inverse document frequency value across all texts in the first class, wherein the word that is associated with the second class is a word having a highest term frequency inverse document frequency value across all texts in the second class, and wherein deleting the word that is associated with the second class and adding the word that is associated with the first class causes the text sample to more closely conform to a hierarchical graph of classes that includes the first class, such that text classification using the trained text classification model exhibits superior performance in discriminating between the first class and the second class.

10. The method of claim 1, wherein the text classification model is a neural network model.

11. A non-transitory computer readable storage medium comprising a computer readable program for text classification, wherein the computer readable program when executed on a computer causes the computer to perform the steps of:

identifying a text sample that has been derived from another text sample in a first text class of a plurality of hierarchical graphs of text classes, the identified text sample having a class label that identifies the first text class, wherein the identified text sample is more similar to a second text class in the plurality of hierarchical graphs of text classes than to the first text class, according to a similarity metric;

deleting a word from the identified text sample that is associated with the second text class, to move the identified text sample away from the second text class in a semantic space, causing the identified text sample to more closely conform to a hierarchical graph of classes that includes the first class;

adding a word to the identified text sample that is associated with the first text class, to move the identified text sample toward the first text class in the semantic space, causing the identified text sample to more closely conform to a hierarchical graph of classes that includes the first class;

training a text classification model to assign class labels to samples, using the text sample as training data, to provide superior text classification performance in discriminating between the first class and the second class; and performing text classification on an input text using the trained text classification model implemented on a processor device.

12. A text classification system, comprising:
a hardware processor; and
a memory that stores a computer program product, which, when executed by the hardware processor, causes the hardware processor to:
  identify a text sample that has been derived from another text sample in a first text class of a plurality of hierarchical graphs of text classes, the identified text sample having a class label that identifies the first text class, wherein the identified text sample is more similar to a second text class in the plurality of hierarchical graphs of text classes than to the first class according to a similarity metric;
  delete a word from the identified text sample that is associated with the second class, which moves the identified text sample away from the second text class in a semantic space and causes the identified text sample to more closely conform to a hierarchical graph of classes that includes the first class,
  add a word to the identified text sample that is associated with the first class, which moves the identified text sample toward the first text class in the semantic space and causes the identified text sample to more closely conform to a hierarchical graph of classes that includes the first class;
  train a text classification model to assign labels to samples using the text sample as training data, to provide superior text classification performance in discriminating between the first class and the second class; and
  perform text classification on an input text using the trained text classification model implemented on a processor device.

13. The text classification system of claim 12, wherein the verification and correction module is further configured to compare the text sample to a representative text sample from each class in the plurality of hierarchical graphs of classes according to the similarity metric.

14. The text classification system of claim 12, wherein the plurality of hierarchical graphs of classes comprises a plurality of disjoint graphs.

15. The text classification system of claim 14, wherein the first and second classes do not belong to a same graph hierarchy.

16. The text classification system of claim 14, wherein each hierarchical graph comprises a plurality of classes and a plurality of directed edges between classes, with each directed edge indicating a hierarchical relationship between its connected classes.

17. The text classification system of claim 12, wherein the word that is associated with the first class is a word having a highest term frequency inverse document frequency value across all texts in the first class.

18. The text classification system of claim 12, wherein the word that is associated with the second class is a word having a highest term frequency inverse document frequency value across all texts in the second class.

* * * * *